United States Patent [19]

Chou

[11] Patent Number: 5,185,162
[45] Date of Patent: Feb. 9, 1993

[54] CORROSION AND WEAR RESISTANT BIMETALLIC CYLINDER

[75] Inventor: Schiao F. Chou, Pulaski, Va.

[73] Assignee: Xaloy, Incorporated, Va.

[21] Appl. No.: 714,895

[22] Filed: Jun. 17, 1991

[51] Int. Cl.$^5$ .......................... B29B 7/80; B28B 7/36
[52] U.S. Cl. ........................ 425/183; 148/332; 148/335; 148/336; 249/114.1; 249/116; 249/135; 425/200; 425/207
[58] Field of Search ............... 148/320, 330, 332, 333, 148/334, 335, 336; 425/200–209, 183, 190; 249/112, 114.1, 116, 135

[56] References Cited

U.S. PATENT DOCUMENTS

| | | | |
|---|---|---|---|
| 3,663,316 | 5/1972 | Kulmburg | 148/335 |
| 3,829,260 | 8/1974 | Shimoda | 148/15.5 |
| 4,171,233 | 10/1979 | Voort | 148/335 |
| 4,435,226 | 3/1984 | Neuhauser et al. | 148/332 |
| 4,536,232 | 8/1985 | Khandros et al. | 148/324 |
| 4,741,880 | 5/1988 | Lang et al. | 148/335 |
| 4,804,021 | 2/1989 | Hasegawa et al. | 148/335 |
| 4,863,661 | 9/1989 | Maddy | 249/116 |

FOREIGN PATENT DOCUMENTS

| | | | |
|---|---|---|---|
| 47-31205 | 8/1972 | Japan | |
| 579338 | 11/1977 | Japan | |
| 60-165358 | 8/1985 | Japan | 148/335 |
| 248238 | 3/1968 | U.S.S.R. | 148/335 |
| 1067077 | 1/1984 | U.S.S.R. | 148/335 |

*Primary Examiner*—Jay H. Woo
*Assistant Examiner*—Khanh P. Nguyen
*Attorney, Agent, or Firm*—Ostrolenk, Faber, Gerb & Soffen

[57] ABSTRACT

A bimetallic cylinder of steel having an alloy inlay which includes chromium boride in a matrix of iron alloy containing carbon, silicon, nickel and copper. The chromium boride imparts wear resistance to the inlay and relatively high contents of chromium, nickel and silicon and the presence of molybdenum and copper in the alloy make it resistant to corrosion. The cylinder is useful for injection molding and extrusion of plastics.

2 Claims, No Drawings

CORROSION AND WEAR RESISTANT BIMETALLIC CYLINDER

BACKGROUND OF THE INVENTION
1. Field of the Invention

In the plastics industry, screws and cylinders are used in various injection molding and extrusion processes. This invention relates to a corrosion and wear resistant bimetallic cylinder used in these processes.

2. Description of the Related Art

In injection molding and extrusion processes, solid plastic resin is heated and liquefied inside a hollow cylinder by heater bands that envelop the cylinder and by the frictional heat generated by the rotational action of the screw. The molten plastic is discharged from the cylinder and enters a mold. The molten plastic solidifies in the mold to form various objects During the plasticization process, the plastic resin will wear against the bore of the cylinder. Besides, the plastic often contains various fillers which are highly abrasive Also, aggressive chemicals generated during the process can corrode the bore. For instance, fluoropolymer, polyvinyl chloride, and resins containing flame retardants will generate hydrofluoric or hydrochloric acid, which are very corrosive. If the bore of the cylinder is enlarged due to wear or corrosion, the efficiency of the process will decline.

One approach to solve the problem of wear is to nitride the steel bore The nitrided surface is very hard and resistant to wear. However, the nitrided layer is only 0.005 to 0.020 inches deep, and the concentration of nitride decreases rapidly with the depth of the layer. The wear resistance of the nitrided surface will drop quickly with time as the very hard top surface of the nitride layer is worn. Furthermore, such a cylinder has a poor corrosion resistance.

A second approach is to cast a hard and wear resistant alloy inside a hollow steel cylinder by a centrifugal casting process. The melting point of the casting alloy is lower then that of the steel by a few hundred degrees Fahrenheit. In this process, the alloy is loaded inside the hollow cylinder, and the ends of the cylinder are sealed. The cylinder is then placed in a furnace at a temperature high enough to melt the alloy but sufficiently lower than the melting point of the steel. The steel cylinder is then rotated rapidly about its axis to distribute the molten alloy as a continuous layer on the inside of the cylinder. Upon cooling, this molten alloy solidifies and metallurgically bonds to the steel bore to form a hard, and wear resistant inlay. This inlay then is honed to the correct diameter and surface finish. The inlay is typically 0.060 inches to 0.125 inches thick. The chemical composition and hardness is uniform across the entire inlay thickness. The inlay alloy contains various corrosion resistant elements. Presently, such a bimetallic cylinder is most reliable to resist corrosion and wear in all injection and extrusion processes.

Facing the increasing demand of processing more abrasive and corrosive resins, inlay alloy design for a bimetallic cylinder is very critical. The following must be satisfied to make such a cylinder:

1. The melting point of the inlay must be a few hundred degrees Fahrenheit below the melting point of the steel.

2. The inlay alloy must have good castability so that the inlay will not have any casting defects such as shrinkage voids or porosity 3. The inlay alloy must have good hardness and wear resistance.

4. The inlay alloy must have good corrosion resistance.

5. The inlay alloy must have reasonably good resistance to thermal shock, or the inlay will crack upon cooling during fabrication.

6. The inlay alloy must have sufficient fracture strength or the cylinder will not have a sufficient pressure carrying capacity.

It is an object of the invention to provide a bimetallic cylinder which avoids the need for a nitrided layer and has good corrosion and wear or abrasion resistance.

It is another object of the invention to provide a bimetallic cylinder having an alloy inlay that achieves at least a 40% improved wear or abrasion resistance than standard alloy inlays.

A further object of the invention is to provide an alloy inlay having an acceptable level of corrosive wear resistance in normal processing environments including the processing of low and high density polyethylene, polyvinyl chloride and acrylonitrile-butadiene-styrene copolymer.

A further object of the invention is to provide an inexpensive alloy inlay for bimetallic cylinders for use in place of premium alloy inlays.

A further object of the invention is to provide an alloy inlay that provides adhesive wear compatibility with normal screw hardfacing alloys, i.e., stellite 6 and 12, colmonoy 56, nitralloy 135 nit , and flame hardened screws.

A further object of the invention is to provide an alloy inlay with improved pressure carrying capacity in the "as cast" condition, which is important in injection molding equipment.

SUMMARY OF THE INVENTION

These objects, and other objects, are achieved by providing a steel cylinder having a corrosion and wear resistant iron-based alloy inlay comprising the following ingredients in about the proportions set forth below:

| Ingredient | Weight Percent |
|---|---|
| Carbon | 0.5–1.5 |
| Chromium | 4.0–10.0 |
| Boron | 1.0–3.0 |
| Silicon | 1.0–3.0 |
| Nickel | 3.0–10.0 |
| Molybdenum | 0.5–3.0 |
| Copper | 0.5–3.0 |
| Vanadium | 0–3.0 |
| Iron | balance |

Unless otherwise specified, all percentages expressed in this application are weight percent. Preferably, the steel is AISI 4140 steel and the iron-based alloy inlay comprises the following ingredients in about the proportions set forth below:

| Ingredient | Weight Percent |
|---|---|
| Carbon | 0.7–1.3 |
| Chromium | 5.0–8.0 |
| Boron | 1.6–2.6 |
| Silicon | 1.6–2.8 |

-continued

| Ingredient | Weight Percent |
|---|---|
| Nickel | 4.0–8.0 |
| Molybdenum | 1.0–2.0 |
| Copper | 1.0–2.0 |
| Vanadium | 0–1.5 |
| Iron | balance |

A most preferred iron-based alloy inlay composition comprises about: 0.92% carbon, 7.62% chromium, 1.92% boron, 2.49% silicon, 4.75% nickel, 1.25% molybdenum, 1.29% copper and an iron balance.

A method is also provided for extruding or injection molding plastic using the bimetallic cylinder described above.

DESCRIPTION OF THE PREFERRED EMBODIMENTS

Currently, the plastics industry uses bimetallic cylinders with an Fe-Ni-C-B-Si inlay, such as the inlay alloy known as X101, which is available from the assignee of the present invention (Xaloy, Inc.), as a standard A typical chemical composition of this inlay is:

| Ingredient | Weight Percent |
|---|---|
| Carbon | 2.70 |
| Silicon | 0.57 |
| Nickel | 3.50 |
| Chromium | 1.10 |
| Boron | 1.00 |
| Iron | balance |

This inlay has good wear resistance but its resistance to various halogen acids is not satisfactory.

The inlay alloy of this application includes chromium boride in a matrix of iron alloy containing carbon, silicon, nickel and copper. The hardness of the inlay alloy is about RC57-65. The hard chromium boride makes the invented inlay more resistant to wear, as will be described by way of example later. Generally, the higher contents of chromium, nickel, and silicon and the presence of molybdenum and copper in the alloy make the inlay much more resistant to corrosion by hydrochloric acid, as will also be described by way of example later.

The cylinders of the present invention may be formed of any suitable steel, with AISI 4140 steel being preferred. The chemical composition of 4140 steel is 0.38–0.43% carbon, 0.8–1.1% chromium, 0.15–0.3% silicon, 0.15–0.25% molybdenum, 0.75–1.0% manganese and an iron balance.

The following Example I shows the improved wear and corrosion resistance of cylinders in accordance with the invention as compared with cylinders including the known inlay alloy X101 discussed above. Example II shows the increased pressure carrying capacity of the cylinders of the invention.

EXAMPLE I

An alloy having the following composition was loaded into an AISI 4140 steel cylinder.

| Ingredient | Weight Percent |
|---|---|
| Carbon | 1.20 |
| Copper | 1.69 |
| Molybdenum | 1.73 |
| Boron | 3.34 |
| Silicon | 4.20 |

-continued

| Ingredient | Weight Percent |
|---|---|
| Chromium | 10.50 |
| Nickel | 6.70 |
| Manganese | 0.42 |
| Iron | balance |

The cylinder was pre-bored to a dimension of 0.120 inches over a finished inner diameter of 5.999 inches. Centrifugal casting was performed as follows. The cylinder was heated to a temperature of 2260° F., and inlay alloy was cast inside the cylinder. The cylinder was cooled to room temperature in 5 days, and then was honed, machined to a size of 5.999 inches I.D.×10.5 inches O.D.×208 inches long. The composition of the inlay is shown in the following:

| Ingredient | Weight Percent |
|---|---|
| Carbon | 0.92 |
| Silicon | 2.49 |
| Nickel | 4.75 |
| Chromium | 7.62 |
| Molybdenum | 1.25 |
| Copper | 1.29 |
| Boron | 1.92 |
| Iron | balance |

The contents of the alloy elements in the inlay alloy were less than those in the starting alloy because of dilution from the backing steel during casting.

The hardness of the inlay was RC63 to RC65. The inlay is sound and free of pits or cracks Samples were cut from the inlay, and corrosion and wear tests were conducted on these samples:

1. CORROSION TESTS

Corrosion tests were conducted in 10 and 50 volume percents of hydrochloric acid solutions at room temperature The samples (1.25"×0.75"×0.05") were submerged in these acid solutions for 7 days. The corrosion rates were calculated based on the weight loss and sample surface area. The corrosion rates of the inlay alloy of the invention and an Z101 inlay standard are listed in the following:

|  | Corrosion Rate in 10 volume % HCl (inches per year) | Corrosion rate in 50 volume % HCl (inches per year) |
|---|---|---|
| inlay of this invention | 0.009 | 0.152 |
| X101 | 0.018 | 0.445 |

Corrosion tests were also conducted in 2 volume percent of hydrochloric acid solution and 2 volume percent hydrobromic acid solution at 212° F. The corrosion rates of the inlay alloy of the invention and an Z101 inlay standard are listed in the following:

| Inlay Type | Standard X101 | Invention |
|---|---|---|
| Corrosion Rate (IPY) | | |
| in 2 Volume % HCl at 212° F. | 13.45 | 0.82 |
| in 2 Volume % | 8.52 | 0.17 |

| Inlay Type | Standard X101 | Invention |
|---|---|---|
| HBr at 212° F. | | |

The corrosion resistance of the inlay alloy of the invention is much better than that of the Z101 standard.

2 Wear Tests

Wear tests were conducted by a German research laboratory, Deutsches Kunststoff-Institut. Samples (0.591"×0.472"×0.197") were tested on an injection molding machine which ran a resin of polycarbonate containing 30% glass. The test temperature was 572° F. The weight losses of the inlay alloy of the invention and the X101 standard due to wear are shown in the following:

| Alloy | Inlay of invention | X101 |
|---|---|---|
| Average Weight Loss (mg) | 0.262 | 0.383 |

The wear resistance of the inlay alloy of the invention was 46% better than that of the X101 standard.

EXAMPLE II

A second bimetallic cylinder with the same inlay was made (1.65" I.D.×4.5" O.D.×24" length). This cylinder was sent to National Forge Company for pressure testing to determine its pressure carrying capacity. The cylinder was pressurized internally until failure occurred. The barrel failed at a internal pressure of 46,500 psi, which corresponds to a hoop stress of 52,400 psi and a Von Mises stress of 85,300 psi. An equivalent X101 cylinder will fail at about 44,500 psi. The pressure carrying capacity of the cylinder of the invention is better.

Although the present invention has been described in connection with a preferred embodiment thereof, many other variations and modifications will now become apparent to those skilled in the art without departing from the scope of the invention. It is preferred therefore, that the present invention not be limited by the specific disclosure herein, but only by the appended claims.

What is claimed is:

1. A cylinder for an injection molding or extrusion machine, said cylinder being formed of a steel having a corrosion and wear resistant iron-based alloy inlay comprising the following ingredients in about the proportions set forth below:

| Ingredient | Weight Percent |
|---|---|
| Carbon | 0.92 |
| Chromium | 7.62 |
| Boron | 1.92 |
| Silicon | 2.49 |
| Nickel | 4.75 |
| Molybdenum | 1.25 |
| Copper | 1.29 |
| Iron | balance. |

2. The cylinder of claim 1, wherein said steel is AISI 4140 steel.

* * * * *